United States Patent Office 3,345,229
Patented Oct. 3, 1967

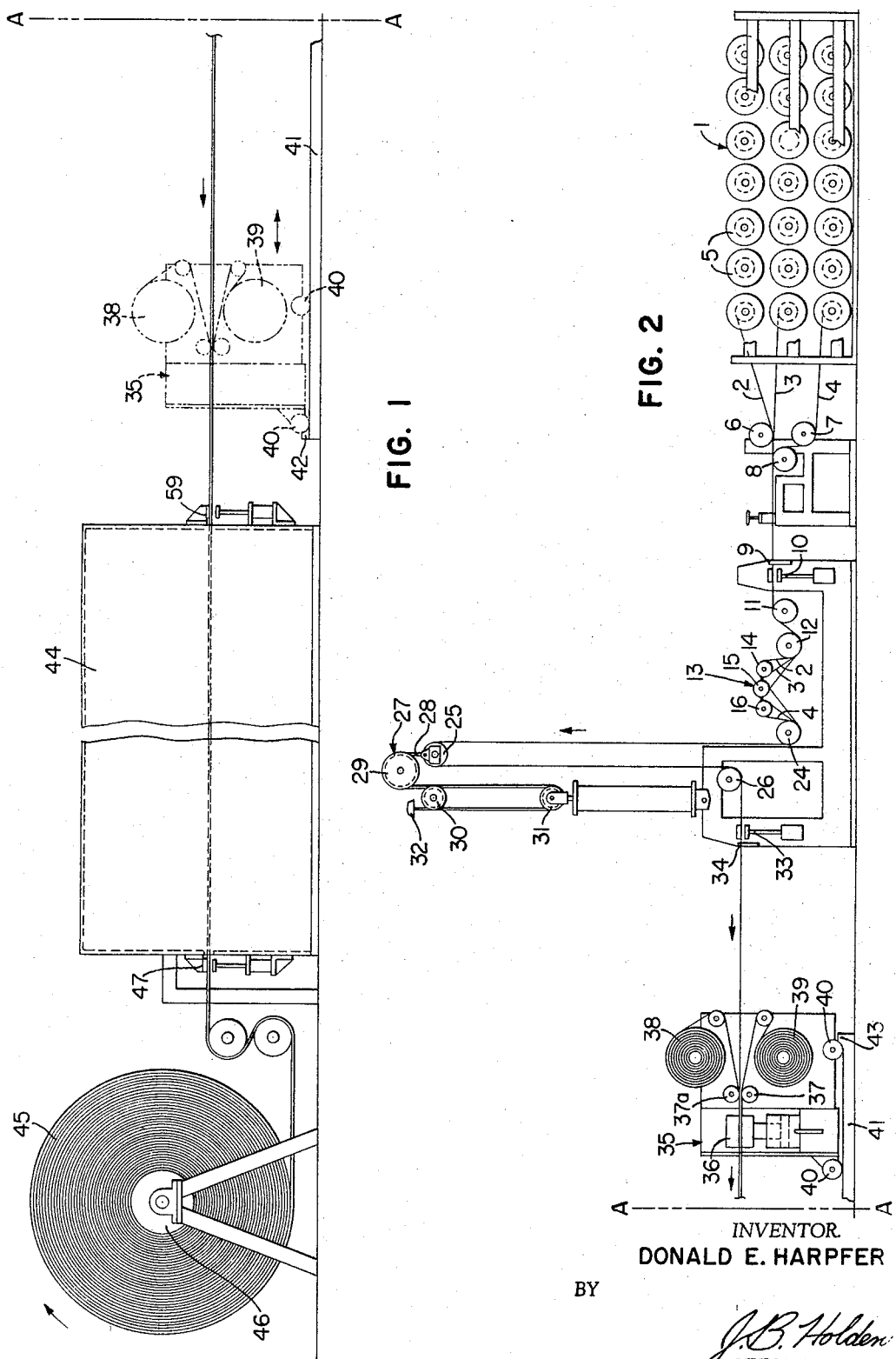

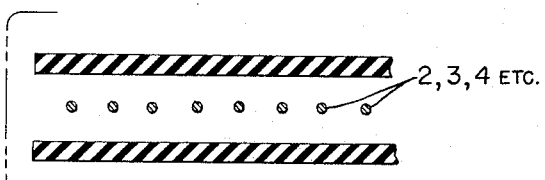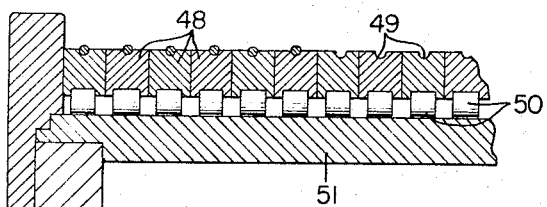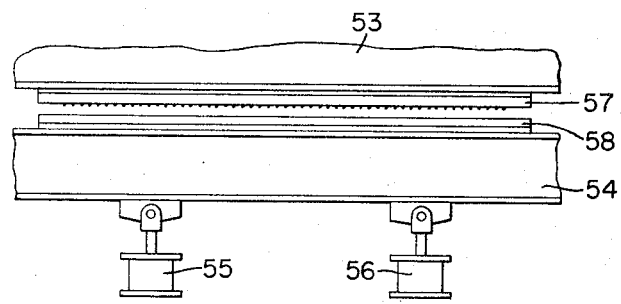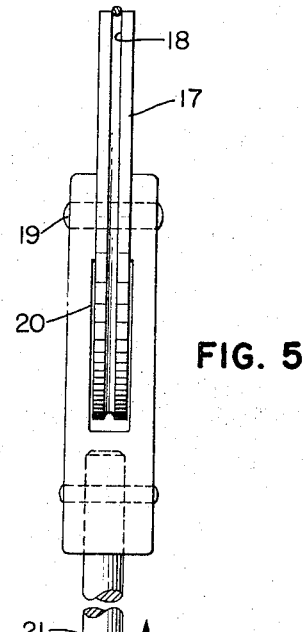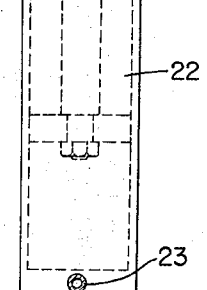

3,345,229
BELT MANUFACTURING APPARATUS
Donald E. Harpfer, Akron, Ohio, assignor to The Goodyear Tire & Rubber Company, Akron, Ohio, a corporation of Ohio
Filed Dec. 4, 1963, Ser. No. 327,975
2 Claims. (Cl. 156—166)

This invention relates to an apparatus and method for building belts and more particularly to flat conveyor belts. The invention contemplates that the belt include a layer of tension elements spaced transversely across the belt to which the belt covers are applied on opposite sides thereof.

In making belts of this type, the usual practice has been to build up a substantial length of the belt carcass by any of several well known means then subsequently subjecting the carcass to heat and pressure, usually by means of a platen press, to vulcanize the carcass to form the finished belt. Under such practices, the belt is vulcanized in intermittent lengths depending upon the press length with the usual technique of providing for press overlap adjacent the platen ends.

Another practice of manufacturing long length conveyor belts involves the use of a pressure band against continuous, slow speed rotating rolls to laminate and vulcanize the belt continuously. The tension elements and the carcass material are fed continuously in between the band and one roll to form the belt.

In the use of the first mentioned method, the subsequent vulcanization requires that the roll of belt be moved into position at the press which is extra handling. In addition, although the individual tension elements may be tensioned initially to a uniform tension, the tension in many instances, will not remain uniform and its retention is dependent entirely upon the ability of the unvulcanized carcass material to adhere sufficiently to the tension element prior to vulcanization. As a result, the tension elements in the vulcanized belt would have varying tensions therein so that the load distribution over the tension elements while the belt was in use would not be evenly distributed.

In the second method, the cost of the equipment is substantial and unless the production demand is great, it is uneconomical to acquire the equipment because the versatility of such equipment is somewhat limited as to the types of products it is suitable for.

The present invention contemplates that conveyor belts of substantial lengths may be made in a continuous process by a series of repetitive intermittent operations consisting of vulcanization, building or fabricating and storing lengths of the tension elements under tension for the building operation. The operations are carried on in sequence to a given section of the finished belt so that the finished belt consists of a continuous length of these sections with the tension elements being retained under the predetermined tension throughout without it being released until subsequent to vulcanization. It is, therefore, an object of this invention to provide a method and apparatus for manufacturing a conveyor belt with a predetermined tension in each tension element.

Another object of the invention is to provide an apparatus for the manufacture of a conveyor belt which retains the tension in the tension elements throughout the manufacture of the belt.

A further object of this invention is to provide an apparatus and method for the manufacture of conveyor belting in long lengths by a series of steps carried out in repeated sequence.

A still further object of this invention is to provide a means of building conveyor belts with only slight modifications to readily available equipment.

These and other objects and advantages of this invention will become apparent hereinafter as the description thereof proceeds, the novel features, arrangements and combination being clearly pointed out in the specification as well as the claims thereunto appended.

In the drawings:

FIGS. 1 and 2 are front elevational views of the head and tail ends of the apparatus respectively, each view being somewhat diagrammatic;

FIG. 3 is a diagrammatic partial section of a belt prior to fabrication;

FIG. 4 is a diagrammatic partial section of a belt after fabrication;

FIG. 5 is a detail elevation of a portion of the apparatus;

FIG. 6 is an enlarged fragmentary section of a portion of the apparatus; and

FIG. 7 is a diagrammatic end elevation of a typical clamping mechanism used in the apparatus.

The apparatus used to carry out this invention is comprised of a series of different apparatuses arranged preferably in tandem for a smooth, straight line of material flow. A creel, a tensioning device, a festoon or storage apparatus, a building apparatus, a vulcanizing press and a belt storage reel are aligned in sequence along with the usual auxiliary equipment such as combs, clamps, etc. normally used in belt manufacturing operations.

Referring now to FIGS. 1 and 2, the reference character 1 represents a typical creel on which spools carrying tension elements are stored. For the purpose of the description the tension elements are assumed to be wire cables although they could be of any of the well known materials used for such purposes and the number of tension elements is dependent upon the particular belt structure being fabricated. For the sake of clarity tension elements 2, 3 and 4 only will be described as it is well known in the art to provide a creel for the storing of a multiplicity of cables or cords on spools 5 from which the tension elements are fed to the building apparatus. The tension elements 2, 3 and 4 pass from the creel 1 around the rollers 6, 7 and 8 to bring them into horizontal alignment. From roller 8, they pass into comb 9 to guide and laterally space tension elements 2, 3 and 4 as is well understood in the art. Clamp 10 as shown is mounted adjacent comb 9 and tension elements 2, 3 and 4 when clamp 10 is in the open position, pass freely therethrough and over and under idler rolls 11 and 12 to guide and position tension elements 2, 3 and 4 properly for the adjacent tensioning device.

The numeral 13 represents generally a tensioning device which as shown, subjects each individual tension element to a predetermined tension simultaneously so that in the finished belt each tension element is under the same tension. It is obvious that if different tensions are desired in different cables, modifications of the device may be made to provide for varying tensions in different elements. In order to accommodate the required number of tension elements, three rows 14, 15 and 16 of tensioning rollers 17 are provided with each row consisting of a group of laterally spaced freely movable rollers 17 with each roller having an arcuate groove 18 (FIG. 5) around the outer periphery thereof to receive a tensioning element therein.

As shown, tension elements 2, 3 and 4 pass over rows 14, 15 and 16 respectively and it is to be understood that the other tension elements preferably are distributed evenly over these rows. A greater or lesser number of rows of rolls 17 may be used depending upon the number and spacing of the tension elements desired in the belt but in any event, a tensioning roller must be provided for each tension element that is incorporated in the belt structure.

In FIG. 5 the typical mounting of a roller 17 in one of the rows is illustrated. Roller 17 mounted on shaft 19 extending through clevis 20 is freely rotatable around shaft 19. Clevis 20 is attached to rod 21 extending from the piston of hydraulic cylinder 22 into which hydraulic fluid enters through inlet 23. When a tension element is trained over one of the rollers 17 of tension device 13 and clamped at a point remote from each side of the rollers, the roller 17 moves up through the action of the cylinders 22 on rod 21 by actuating hydraulic cylinder 22 under a predetermined pressure to subject the tension element to a fixed tension.

After passing over tension device 13, tension elements 2, 3 and 4 pass under idler roll 24 then vertically in an upward direction as shown over freely rotating idler roll 25, then downwardly and under idler roll 26 and out in a horizontal alignment. Roller 25 is a part of a festoon 27 which is a well known structure to receive and store an extra amount of a continuous length of material. For the purposes of illustration roller 25 is movable up and down within limits to accommodate the length of tension element in the festoon. It is essential that the maximum length that the festoon will receive be at least equal to the length necessary for the subsequent building operation. As shown roller 25 is attached to a cable 28 passing around roller 29 thence around pulleys 30 and 31 and the end fixed at point 32. Suspended from pulley 31 is a dead weight, not shown, of sufficient magnitude to load festoon 27 when desired by moving roller 25 upwardly as pulley 31 separates from pulley 30. Preferably means are provided to lock the festoon in position to prevent excessive movement during the tensioning operation.

As tension elements 2, 3 and 4 leave festoon 27 after passing around roller 26 they pass through clamp 33, thence through comb 34 to further assure the proper lateral alignment and spacing immediately prior to incorporating in the belt structure. From this point they enter the belt fabricating or building apparatus 35 consisting essentially of a hydraulically actuated press 36 and a pair of pressure applicator rolls or pinch rolls 37 and 37a which roll the carcass stock from supply rolls 38 and 39 onto opposite sides of the horizontally aligned tension elements. This entire assembly is mounted on rolls 40 so as to be freely movable along track 41 between stops 42 and 43. Press 36 is closed against the carcass stock so as to force it into intimate engagement with the tension elements then the press is moved to the adjacent area where the operation is repeated.

Adjacent the end of the building apparatus is a conventional platen press 44 (diagrammatically illustrated) for vulcanizing the fabricated belt under heat and pressure. Adjacent the end of the press opposite that of the building apparatus is a conventional belt storage device 45 and as shown consists of a large reel 46 around which the cured belt is wound after vulcanization. The reel 46 preferably is driven by a motor, not shown, to withdraw the section of belt after it has been vulcanized from the press and around the reel 46. Immediately adjacent the end of the platen press 44 and between the press and reel 46 is a clamp 47, the operation of which will be described later.

In FIG. 6, a typical construction for idler rolls 24, 25 and 26 is illustrated that provides for free movement of the tension elements thereover and assistance in maintaining the alignment effected by the combs. A series of annular rings 48 having grooves 49 around the outer periphery are mounted on a series of spaced roller bearings 50 to support the rings 48 for free rotational movement. Bearings 50 are supported on sleeve 51 which is mounted on shaft 52 to allow each ring 48 to move independently of the others thus preventing any restriction of the movements of the tension elements through the apparatus.

A typical clamp construction for clamps 10, 33 and 47 is illustrated in FIG. 7 in which upper member 53 is fixed and lower member 54 is movable relative to member 53 by means of hydraulic cylinders 55 and 56. On the face of members 53 and 54 resilient layers 57 and 58 respectively are attached so as to firmly engage all portions of the material being clamped to hold in the clamped position when the clamp is closed. Any type of clamping arrangement may be used, but preferably the clamping should simultaneously clamp the entire transverse width of the belt or parts thereof to provide uniform clamping across the entire width thus retaining uniform tensions transversely across the belt width.

In the manufacture of a belt with the apparatus of this invention the tension elements are threaded from creel 1 through the rollers and comb 9 for aligning the tension elements in a horizontal direction. From comb 9 they pass through the clamp 10 into the tension device with every third element being threaded over the adjacent rolls on one row of tension device 13. From tension device 13 the tension elements pass under roll 24 and are threaded through festoon 27 and under roll 26 into horizontal alignment through clamp 33 and comb 34 to building apparatus 35. The tension elements pass between the platens of press 44 into clamp 47. Once a section of the belt is fabricated in building device 35 it is pulled into the vulcanizing position between the platens of vulcanizing press 44 with a portion extending beyond the press a sufficient distance so as to engage clamp 47. After vulcanization this section is then started onto the wind-up reel 46 and wound therearound so as to draw the adjacent newly built section of belt into the vulcanizing position.

In the start-up operation after the apparatus is threaded, the initial length of the tension elements are extended so as to engage clamp 59 between the building apparatus 35 and press 44 which is then closed so as to firmly hold the tension elements at this position. Clamp 59 is only necessary in the initial start-up operation and is not used thereafter during the manufacture of a length of belting. At this time clamp 10 between creel 1 and festoon 27 is closed to firmly hold the tension elements at that point. The dead weight of festoon 27 is locked into position and tensioning device 13 is activated to apply the predetermined tension to the tension elements. Subsequently clamp 33 between festoon 27 and building apparatus 35 is closed to hold the tension elements in position. Building apparatus 35 is moved to the press end of the length of tension elements in position in building apparatus 35. In successive steps building apparatus 35 is moved to the festoon end for the start of the application of the carcass material to the opposite sides of the tension elements. Hydraulic press 36 of building apparatus 35 is closed momentarily to assure firm intimate contact of the carcass material with the tension elements. This process is repeated along the length of the tension elements until the festoon end of the track is reached.

This fabricated belt section is then pulled into the vulcanizing position in press 44 by reeling the previously vulcanized section after clamps 59 and 33 are opened which simultaneously draws the tension elements stored in the festoon into position in building apparatus 35. Clamps 47 and 33 are then closed to retain the tension in the sections of the tension elements both in press 44 and building apparatus 35. Vulcanizing press 44 is then closed and the belt section therein is vulcanized and during this time clamp 10 is opened. The dead weight is released so as to permit festoon 27 to be reloaded with lengths of the tension elements. Subsequently clamp 10 is then closed so that all clamps except clamp 59 are now closed to retain the tension in the tension elements. The portion of the tension elements in festoon 27 are then tensioned by activating tensioning device 13.

After complettion of vulcanization of the portion of the belt in press 44, clamps 47 and 33 are opened and the vulcanized portion is wound on reel 46. Subsequently the above enumerated steps are repeated until the desired length of belting is manufactured. It will be noted that at no point during the manufacture of the belt is the tension released in either the section being vulcanized or in the adjacent section of belt being fabricated.

While certain representative embodiments and details have been shown for the purpose of illustrating the invention, it will be apparent to those skilled in the art that various changes and modifications may be made therein without departing from the spirit or scope of the invention.

I claim:
1. Apparatus for manufacturing a flat belt having a plurality of longitudinal parallel tension elements incorporated in a vulcanizable elastomeric carcass structure and vulcanizing said carcass in a continuous length, said apparatus comprising:
 (a) an apparatus to subject a length of said carcass with said tension elements therein to heat and pressure to vulcanize the carcass into an integral composite structure,
 (b) an apparatus for assembling a length of said tension elements and carcass of unvulcanized vulcanizable elastomeric material into a composite structure preparatory to vulcanization, said length being at least that of the carcass section being vulcanized in said apparatus adjacent to and aligned with said vulcanizing apparatus,
 (c) a tension element storage device adjacent said fabricating apparatus capable of storing under tension a length of each said tension element at least sufficient for incorporating with the carcass at the assembly apparatus,
 (d) a creel adjacent said storage device from which said tension elements are drawn into said storage device,
 (e) a tensioning device between said storage device and said creel to subject each individual tension element to a predetermined tension which tension is retained throughout the assembling and vulcanizing operations,
 (f) clamping means between said assembling apparatus and storage device and between said creel and tensioning device to selectively engage said tension elements to retain the predetermined tension during the manufacturing operation,
 (g) and a holding apparatus positioned near the end of the vulcanizing apparatus away from the assembling apparatus to engage the vulcanized belt to retain it in a fixed position to maintain the tension elements under the predetermined tension
whereby a continuous length of conveyor belt may be manufactured in intermittent steps wherein a length is being vulcanized, an adjacent length is being assembled for vulcanization and a length of tension elements is stored adjacent to the length being assembled so as to be immediately available for assembling the next length, the tension elements in each step being retained under a uniform predetermined tension at all times from the initial tensioning until vulcanization of the belt structure is completed.

2. The method of manufacturing a belt structure having a carcass in which a multiplicity of parallel tension elements are embedded interiorly of the carcass of vulcanizable elastomeric material comprising the steps of holding the tension elements simultaneously in a fixed position at one point along the length thereof, aligning and uniformly tensioning each tension element along the length thereof at a point remote from said fixed position, clamping said tension elements to maintain such alignment and tension, said clamping being done at a position sufficiently remote from said fixed position to include between the fixed and clamped positions of the tensioned elements a length substantially that of the vulcanizing press and adjacent thereto, a similar length to which the carcass structure is applied, vulcanizing said first length of belt in a press after the carcass material has been applied thereto, applying the carcass of vulcanizable elastomeric material to said second length adjacent said first portion, moving said first portion out of said press when vulcanization is completed to move said second portion into said press for vulcanization and to place a further length of tension elements in position for application of the carcass thereto and repeating said steps thereafter, the predetermined tension in said tension elements being retained at all times throughout said steps in a continuous but intermittent operation whereby a belt is produced having a length greater than the length of the individual portions being subjected to any one of the steps of manufacturing.

References Cited

UNITED STATES PATENTS

| | | | |
|---|---|---|---|
| 1,250,338 | 12/1917 | Nall | 156—467 |
| 1,370,597 | 3/1921 | Lambert | 156—494 |
| 2,062,008 | 11/1936 | Lewis et al. | 156—494 |
| 2,740,459 | 4/1956 | Kilborn et al. | 156—494 |
| 2,797,729 | 7/1957 | Runton | 161—143 |
| 2,969,204 | 1/1961 | Spooner | 156—494 |
| 3,034,566 | 5/1962 | McKay | 156—441 |
| 3,042,569 | 7/1962 | Paul | 156—166 |
| 3,272,680 | 9/1966 | Paasche | 156—494 |

FOREIGN PATENTS

| | | |
|---|---|---|
| 981,187 | 5/1951 | France. |

EARL M. BERGERT, *Primary Examiner.*

P. R. WYLIE, W. E. HOAG, *Assistant Examiners.*